Jan. 20, 1942.  J. J. TOMALIS  2,270,359
COMBINED SCREW AND LOCK WASHER
Filed Feb. 27, 1939
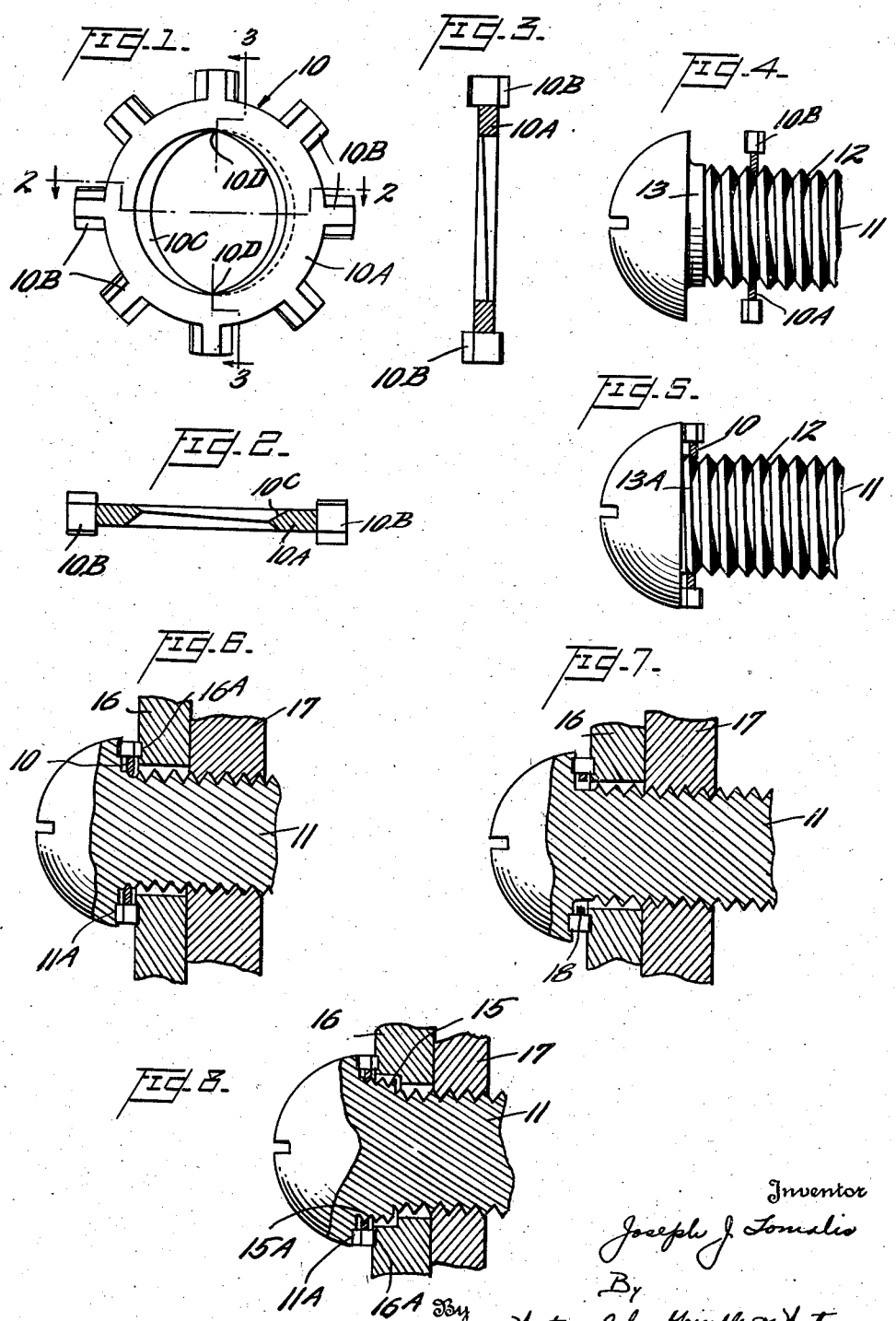
Inventor
Joseph J. Tomalis
By
Watson, Cole, Grindle & Watson
Attorney Patented Jan. 20, 1942

2,270,359

UNITED STATES PATENT OFFICE 2,270,359

COMBINED SCREW AND LOCK WASHER

Joseph J. Tomalis, Providence, R. I., assignor to American Screw Company, Providence, R. I., a corporation of Rhode Island Application February 27, 1939, Serial No. 258,847

2 Claims. (Cl. 151—32)

This invention relates to a combination of a screw or bolt and a lock washer, particularly a lock washer of the general type which includes an annular central portion having external radial teeth which are twisted or offset to engage the under side of the screw head and the work piece in which the screw is inserted. The hole in the washer is threaded internally to fit the threads cut or rolled on the shank of the screw and the washer is attached to or firmly combined with the screw by means of additional or supplementary helical threads formed on the shank of the screw near the head thereof, such supplementary threads being cut or formed by the washer itself as the washer and screw are rotated relative to each other. One purpose of the invention is to provide a combination of the kind described in which the screw and washer can be combined and sold as a pre-assembled unit and in which the parts are so firmly secured together as to prevent axial separation thereof before being used. A further object is to form a combination of screw and washer which, when in position on the work, will serve to prevent any shifting or relative movement between the screw and washer even under extreme conditions of vibration, and which will thus function more effectively in securing together parts of machinery and the like where extreme vibration occurs. These and other advantages of the invention will more fully appear hereinafter.

The following specification and the accompanying drawing forming a part hereof will serve to disclose the nature of the invention and various applications thereof. In said drawing, Figure 1 is a plan view of a lock washer of the kind preferably employed in producing the combination forming the invention;

Figure 2 is a transverse section on the line 2—2 of Figure 1, and Figure 3 is a similar section on the line 3—3 of Figure 1;

Figure 4 is a longitudinal side view of a screw having working threads thereon and a threaded washer moved partly along the working threads thereof;

Figure 5 is a side view similar to Figure 4, but showing the washer advanced along the screw shank until the washer has cut or formed additional helical threads on the screw shank and is tightly engaged against the screw head;

Figure 6 is a section showing a screw and washer in assembled relation with parts in which the screw is inserted, the washer being locked directly to the screw shank;

Figure 7 is a sectional view similar to Figure 6, but showing a conventional lock washer not locked to the screw shank; and Figure 8 is a longitudinal section of a modified arrangement in which the shank of the screw is enlarged adjacent the head, the washer being mounted on such enlarged portion by supplemental threads formed thereon.

In applying the invention in practical use, a thin flat lock washer of the kind shown at 10 in the various figures is preferably employed. This type of washer, which is well known in the art, is provided with an annular body portion 10A and radially projecting prongs or teeth 10B which are bent or twisted to form sharp corners for engaging the bottom of the screw or bolt head and the work and thus prevent rotation of the screw. According to the present invention, the hole in the washer is internally threaded to fit the working thread cut or rolled on the screw or bolt to which the washer is applied. As ordinarily made, the thickness of the washer is such that only part of one thread may be formed in the hole, but such a partial thread will serve the purposes of the invention. The threaded hole in the washer may be made in the form of a regular V-point thread as indicated at 10C in Figure 2, each thread 10C extending substantially half way around the periphery of the hole and terminating at diametrically opposite points indicated at 10D. The diameter of the hole between these points is such as to enclose the entire outside diameter of the screw, plus necessary clearance. For use with screws having cut threads, the threads 10C of the washer may be made of a diameter substantially equal to the root diameter of the working threads on the screw. For use with a rolled screw thread, the minor diameter of the thread 10C of the washer may be made somewhat less than screw pitch diameter, but greater than the screw root diameter. The thread formation in the washer is provided as described in order to facilitate manufacture of the washer by stamping or punching, rather than by tapping a thread therein. However, in thicker washers it may be necessary and desirable to tap the thread, in which case the hole would have a complete thread all around.

In producing washers of the kind described, they are preferably formed of high carbon steel material and subsequent to the forming thereof, they are heat treated so as to possess live action or spring action, and when thus treated, the thread of the washer is capable of cutting or forming helical threads in softer material such as usually employed in making screws and bolts.

With ordinary methods of screw manufacture, the working thread is cut or rolled on the shank of the screw so that a portion of the shank between the thread and the underside of the head is left unthreaded. In the various views of the drawing the screw is indicated at 11, the working threads at 12 and the usual unthreaded portion of the shank is shown at 13 in Figure 4, such unthreaded portions usually being more extensive in rolled thread products. On a cut thread screw or bolt, this unthreaded portion of the shank is generally of a diameter equal to the major diameter of the working thread, as indicated in Figure 4. In the case of rolled thread products, such unthreaded portion will generally be of a diameter equal to the pitch diameter of the working thread.

As previously noted, the invention presents two principal aspects. It may be employed in forming a combined screw and washer assembly which may be made and sold as an article of manufacture. Also it may be employed in any relation where a screw is inserted in a work piece and where it is essential to guard against loosening of the screw by vibration.

Where it is desired to form a screw and washer assembly, the washer 10 by reason of the threaded hole therein is advanced along the working threads 12 of the screw as indicated in Figure 4 until it engages the unthreaded shoulder or portion 13 on the screw shank. At this point the washer may be held in any suitable manner against rotation, and upon rotation of the screw 11 the threads in the washer will cut or form additional or supplementary helical threads on the screw shank, as indicated at 13A, and will be advanced along the shank until it contacts with the underside of the screw head. The additional helical threads 13A cut or formed by the washer itself will frictionally engage the threads on the washer and will thus form effective means for firmly securing the washer to the screw so that the parts will not become axially separated and the assembly will remain in assembled condition ready for use whenever desired. The same procedure may be followed in forming an assembly of a washer and screw having a rolled thread.

In the arrangement shown in Figure 5, the shank is enlarged adjacent the head as indicated at 15, and such enlargement may be unthreaded and the washer may be formed with a hole of proper size to receive such enlargement and with threads therein which will form additional helical threads 15A on the enlargement, whereby the washer will be firmly secured against axial movement on the screw.

It will thus be seen that the invention may be utilized to produce various forms of pre-assembled screw and lock washers in which the washer is firmly mounted on and secured to the screw shank by means of helical threads cut or formed thereon by the washer itself.

As previously noted, the invention has particular utility in providing means for firmly holding a screw in a piece of work, even under extreme conditions of vibration. This is illustrated in Figures 6 and 8 of the drawing, in each of which the screw or bolt 11 is mounted in a work piece 16 and is threaded into a second piece 17 which may be a nut or a second work piece. The washer 10 is thus tightly clamped between the work piece and the screw head. A pre-assembled screw and washer as above described may be used and the screw may be threaded into the work until the washer is tightly clamped between the two. If a screw and lock washer not previously assembled are to be used, the washer may be advanced along the thread of the screw 11 until it contacts the unthreaded portion 13 thereof, which may be done before the screw is inserted in the work or during the operation of inserting the same. When the threaded portion of the washer contacts the unthreaded portion of the screw shank and the face of the washer engages the work piece, it will be seen that further rotation of the screw will cause the washer to cut or form additional helical threads in the unthreaded shank of the screw and advance toward the head of the screw until it is securely clamped in position with the twisted teeth of the washer biting into both the work piece and the bottom of the head, as shown at 10A and 11A in the various figures of the drawing. In other words, in such an assemblage, the washer and screw and work piece will be locked together at three points of contact, namely, the tight engagement between the washer and the supplementary helical threads formed on the screw shank by the washer, the biting of the washer teeth into the work, and the biting of said teeth into the underside of the screw head. This secure locking of the parts together will avoid any possibility of any loosening or transverse shifting or slipping of the screw relative to the washer or the work so that the screw will remain tightly locked in position in the work piece even under extreme conditions of vibration. In Figure 7 of the drawing the usual arrangement is shown in which the washer is more or less spaced from the screw shank as indicated at 18. Such an arrangement will permit relative motion between the parts which are not firmly locked together at all three points of contact as above described.

It is apparent that the invention may be employed in various relations other than those shown and described, which are intended as illustrative only. In actual operation it is found that the internal threads 10C of the washer actually cut away or remove little or no metal of the screw shank, but merely serve to displace or force aside the metal of the shank to form the helical grooves or threads 13A.

Having thus described the invention, what is claimed as new and desired to be secured by Letters Patent is:

1. As an article of manufacture a combined screw and lock washer comprising a screw having a head and a shank, said shank having helical working threads formed thereon which terminate at a point spaced from the underside of said head, a washer mounted on the portion of said shank adjacent said head, said washer having a hole therein provided with internal threads shaped to cooperate with the working threads on said shank, whereby said washer may be rotated along said shank, said shank having supplementary threads on the portion thereof between said working threads and the underside of said head and on which said washer is firmly mounted, said supplementary threads being formed on the screw shank by relative rotation between said washer and shank, and constituting means for frictionally securing the washer on the screw shank adjacent said head.

2. A combined screw and lock washer comprising a screw having a head and a shank, said shank having working threads thereon which terminate at a point spaced from the underside of said head, a washer mounted on a portion of said shank adjacent said head, said washer having a hole therein provided with internal threads shaped to fit and cooperate with the working threads on said shank, whereby said washer may be rotated along said shank, said internal threads in the washer having a minor diameter less than the diameter of said portion of the shank, means for securing said washer on said portion of the shank adjacent the screw head, said means comprising supplementary threads formed on said portion of the shank by the threads in said washer due to relative rotation of the washer and shank, the washer being mounted on and firmly secured to said supplementary threads by frictional engagement therewith.

JOSEPH J. TOMALIS.